June 2, 1936.  A. L. V. C. DEBRIE  2,043,155
CINEMATOGRAPHIC VIEW TAKING CAMERA
Filed Nov. 1, 1934    4 Sheets-Sheet 1
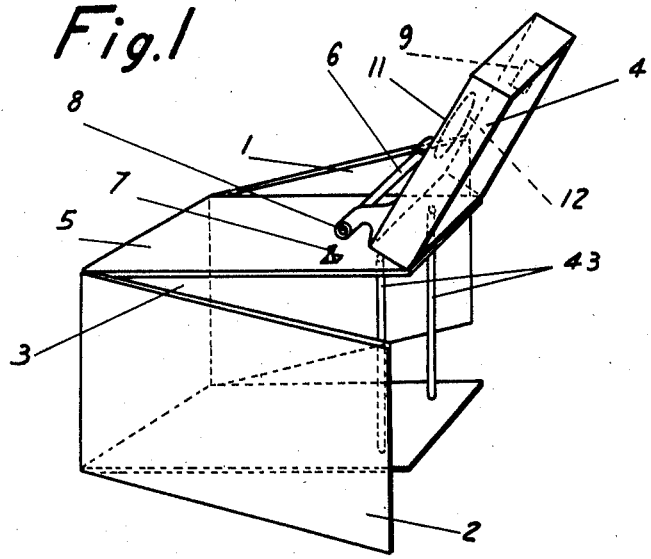
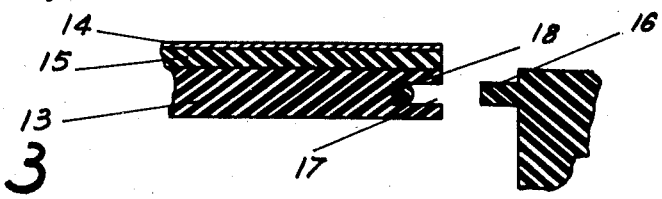
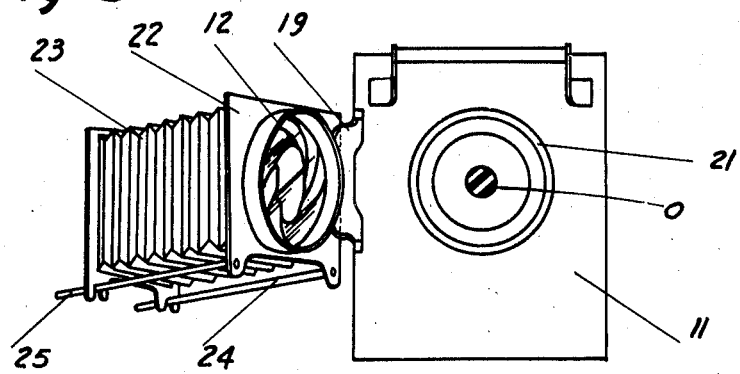

June 2, 1936.  A. L. V. C. DEBRIE  2,043,155
CINEMATOGRAPHIC VIEW TAKING CAMERA
Filed Nov. 1, 1934  4 Sheets-Sheet 2
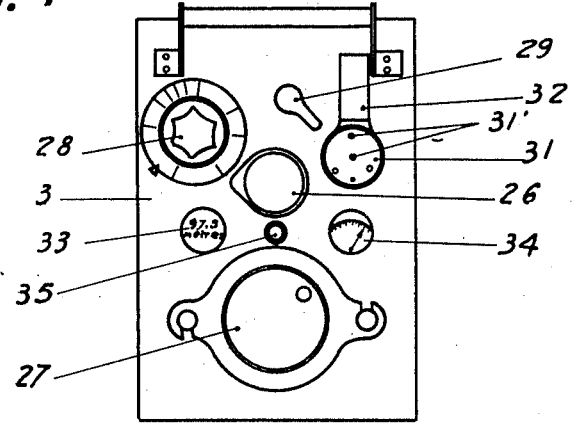
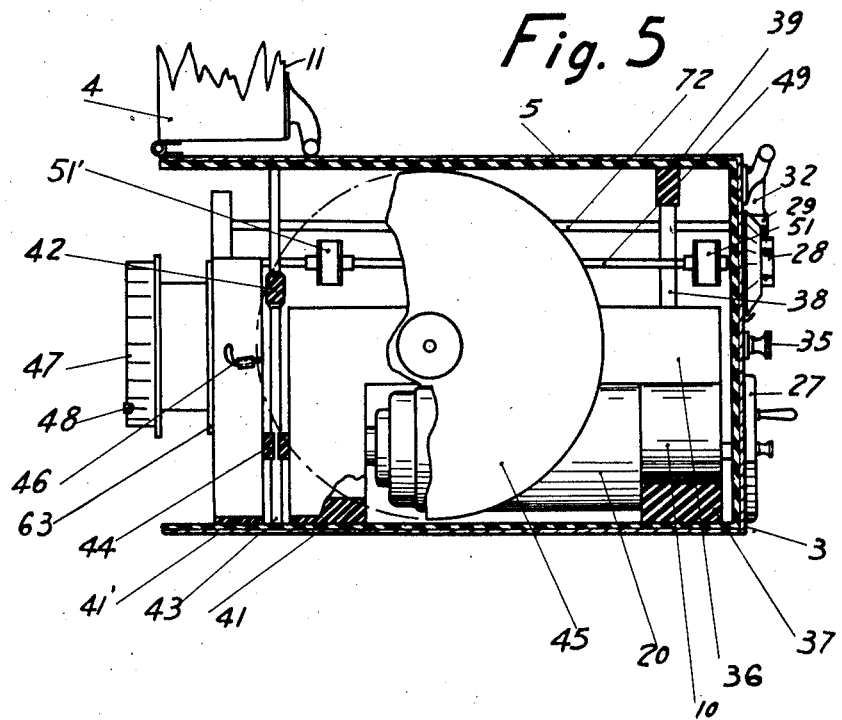

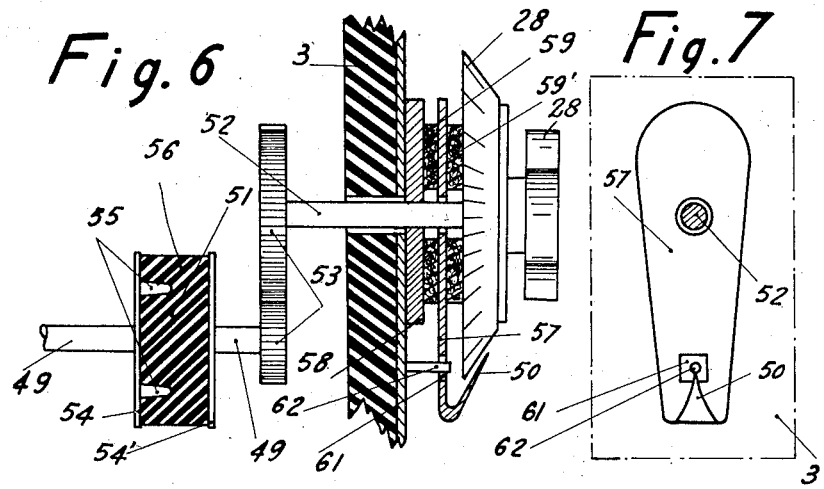
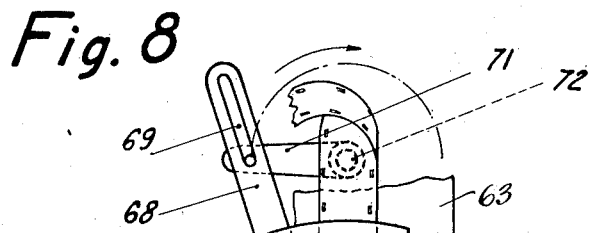
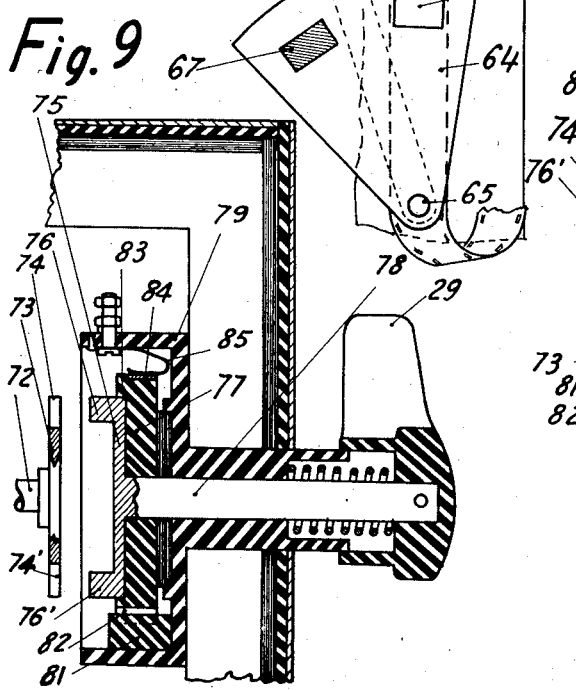
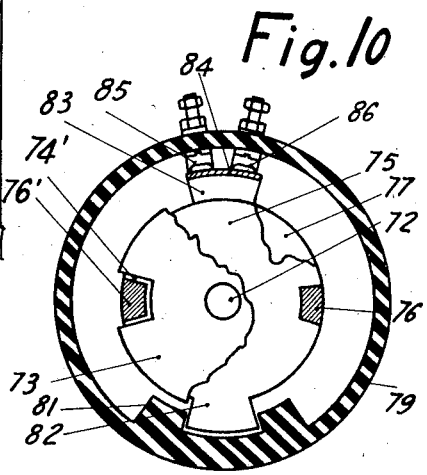

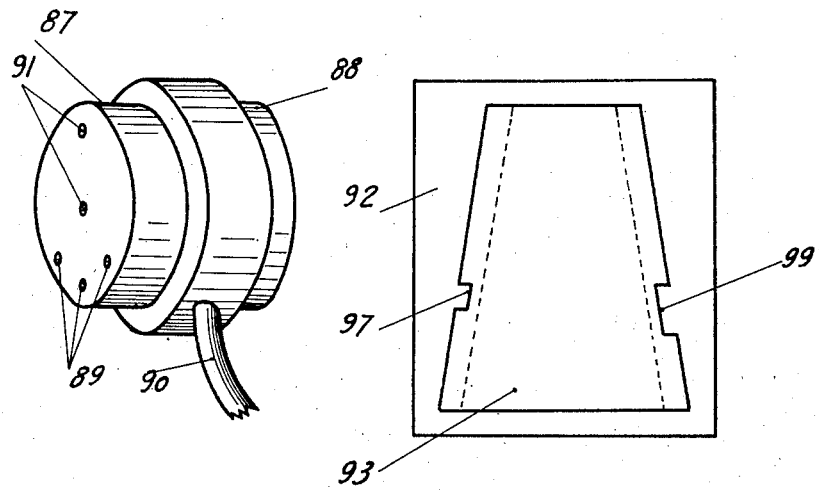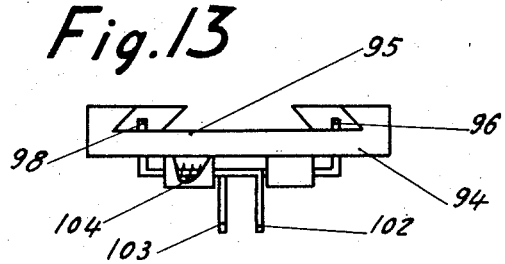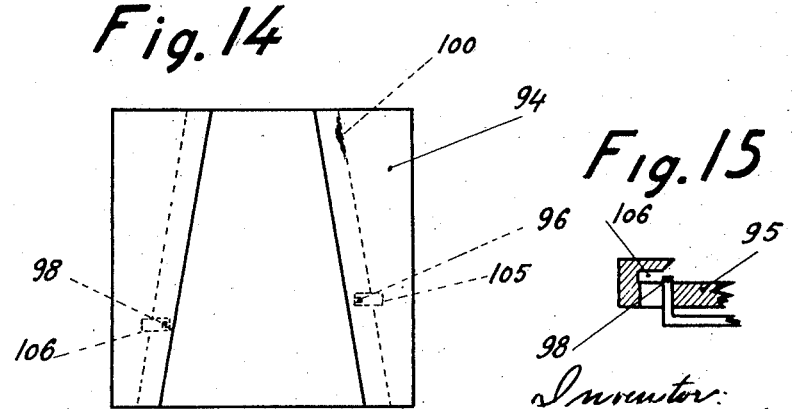

Patented June 2, 1936

2,043,155

UNITED STATES PATENT OFFICE 2,043,155

CINEMATOGRAPHIC VIEW TAKING CAMERA

André Léon Victor Clément Debrie, Paris, France

Application November 1, 1934, Serial No. 751,073
In France November 7, 1933

7 Claims. (Cl. 88—16.2)

Since sound films are in practical use it is necessary to have view taking cameras which are perfectly silent so as to avoid the recording of any background sounds or parasitical noises on the sound strip.

To achieve this, it has been merely proposed heretofore to enclose an ordinary camera in a sound-proof case: this has led to very large-sized and heavy apparatuses which are consequently difficult to handle.

My invention has for its object a cinematographic view-taking apparatus which works in a silent manner, the walls of the case being nonpermeable for the sounds originating inside it, the control mechanism being insulated with reference to the case walls by means of supports which do not transmit the vibrations of the mechanism to said walls, the controlling parts passing through the walls to the outside of the case being also arranged so as to not transmit the mechanical vibrations of the different parts and the acoustic vibrations of the air inside the case. I obtain thus an apparatus the size and weight of which are substantially equivalent to those of ordinary cameras.

I have described hereinbelow and illustrated in accompanying drawings a form of execution of my invention chosen by way of example.

Fig. 1 is a perspective view of the empty case.

Fig. 2 is a cross-section of a wall of this case.

Fig. 3 shows the front panel of the case with the shutter carrying the glass pane and the auxiliary parts open.

Fig. 4 shows the arrangement of the control parts on the rear panel of the apparatus.

Fig. 5 is a longitudinal cross-section through the case and mechanism fitted therein showing diagrammatically the manner of insulating the control mechanism with reference to the case.

Figs. 6 and 7 show the means passing through the rear panel of the casing for controlling the focusing of the apparatus.

Figs. 8, 9 and 10 show the parts also passing through the rear panel of the casing for allowing the focusing on a ground glass. Fig. 8 is a front view of the pivoting plate carrying the ground glass; Fig. 9 is a longitudinal vertical section through the safety mechanism controlling same of which Fig. 10 is a transverse cross-section at the inner end thereof.

Fig. 11 is a perspective view of the current feeding jack used for reversing the direction of rotation of the motor.

Lastly Figs. 12, 13, 14 and 15 show the camera mounted on its stand. Fig. 12 is a plan view of the mounting for securing the camera on its stand; Figs. 13 and 14 are cross-sectional and plan view of the female part thereof and Fig. 15 illustrates the manner of bolting the male and female parts together.

The case of the camera (Fig. 1) is constituted by a parallelepipedic box the lateral panels 1 and 2 of which are hingedly secured to the rear panel 3. The front 4 of the box is hingedly secured to the top 5 and may be opened as shown on the figure. The front 4 carries a handle 6 for hand transportation of the camera. The handle is hollow and contains a bolt engaging a hooked part 7 carried by the top panel 5 when it is desired to hold the front of the box wide open. The disengagement of the bolt is performed by pushing a knob 8 on the handle 6. The front panel 4 is also provided with an opening 9 in one of its flanges, said opening being closed by a thick glass and allowing, as explained hereinafter, the reading of the focusing scale for the object-glass. On the other hand the main part 11 of the front panel is provided with a large aperture 12 also closed by a glass pane with parallel faces, which pane comes when the box is closed in front of the object-glass and serves for the view taking.

Of course the movable panels 1 and 2 and the front panel 4 are provided with locking means of known type which need not be described nor illustrated holding them in the desired position when the box is closed.

In order that the box should not transmit to its outside any sounds or noises i. e. any vibrations of air produced inside the case through operation of the control mechanism, the walls are built so as to be nonpermeable to sound or acoustically insulated. I have found that electrically insulating material is also acoustically insulating, which allows an easy choice for the material forming the box. This material is preferably formed by plates 13 (Fig. 2) of soft ebonite, i. e. with a large proportion of rubber, said plates being outwardly protected by a metal sheet with the interposition of a sheet of yielding rubber. The connection between the different panels is obtained through a lateral elongated tongue 16 integral with one of the panels and engaging a groove 17 in the other, a tubular or cylindrical string 18 of soft rubber being disposed at the bottom of said groove.

The parallel-faced glass pane 12 is carried by a shutter 19 (Fig. 3) hingedly secured to the front panel 11 of the case, while a bolting system not shown carried preferably at the free edges, facing one another of the front panel and of the shutter 19 including the parts carried thereby allows it to be held against said panel. The ring in which the glass pane is fitted compresses then a rubber ring 21 carried by the panel 11. On the glass-carrying ring may be mounted through the agency of a fastening ring a panel 22 carrying different auxiliary parts such as the diaphragm D located in front of the object glass O, bellows and the like. Fig. 3 shows the bellows 23 secured to this panel and slidably mounted on the two guiding rods 24 and 25 also mounted on the panel 22.

This arrangement allows the setting and adjustment without any opening of the case, of the auxiliary parts the adjustment of which may change during the view taking. When the shutter 19 has been pivotally moved aside through a pivotal motion with reference to the front panel 11, it is possible to obtain admittance to the object-glass carrier, which allows in particular the cleaning or changing of the object-glass without opening part 4 of the box or else the securing of a screen or the like part on the inner collar provided therefor.

The rear panel 3 of the case shown in Fig. 4 carries several adjusting and controlling parts which it may be necessary to actuate or to examine during the view taking, such as the magnifying glass 26 provided with an eye-rest and adjustment means not shown, a plug carrying a handwheel 27 for manually driving the mechanism, the knob 28 for focusing the object-glass the handle 29 for bringing in place of the usual gate a ground glass for focusing on the latter, current-terminals 31 and an electromagnet 32 serving as will be explained hereinafter for the automatic switching off of the current through the motor, the glass-panes 33 and 34 allowing inspection of the meters giving out the revolutions made and the length unwound as well as the speed and lastly the return to zero knob 35 for the meters.

It is apparent that the case thus designed may be closed in a tight manner; there is no direct communication between the outer atmosphere and the air contained in the case; consequently the vibrations of the latter corresponding to the noises and sounds produced by the working of the control gearwork or mechanism cannot be transmitted to the outside of the case.

Moreover it is necessary to prevent the vibrations of the mechanism producing these sounds and noises from being transmitteed outside through the parts connecting the case with the mechanism inside it. To this end the mechanism is carried and held in place by means of thick pieces of rubber or the like elastic material, which damp the vibrations and prevent them from being transmitted to the walls of the case.

These supporting means are shown diagrammatically in Fig. 5. To the rear the mechanism assembly extends as an annular part 16 carrying the motor 20 and resting on the bottom of the case through the agency of thick rubber pieces 37. The mechanism carries at its upper part a metal strut 38 bearing against the upper panel through the agency of a thick rubber wedge 39. The front of the mechanism lies on heavy rubber plates 41 and 41' and its upper part is held by rubber wedges 42 secured to two pillars 43 arranged to the right and left of the mechanism and held between the upper and lower panels of the case; other wedges 44 fitted between these pillars and the mechanism make the securing of the latter complete.

The feed and take up reels such as 45 are arranged to either side of the mechanism; they bear against the latter with the interposition of felt wedges and are held fast by bolts 46 of moulded plastic material in order to prevent any metallic vibrations.

The motor 20 is inserted after opening the rear panel 3 closed normally by the plug 27 carrying the driving fly-wheel engaging the motor shaft through any suitable connection. The motor is chosen in accordance with the kind of current available, preferably three-phase current. It includes speed-reducing means which gives the driving shaft the same speed say 1440 R. P. M. whatever the frequency of the feed current may be. The mechanism driven by the motor includes the switch mechanism described in my prior specification No. 1,988,980 "Safety closing circuit device for preventing stuffing in cinematographic apparatuses". This switch mechanism causes, whenever the film speed and the speed of the driving mechanism are no longer in concordance, current to pass through the electro-magnet 32 which actuates a switch cutting off the current feeding the motor. Moreover in order to avoid as much as possible all metallic noises, I use rubber for making the film pressing frame.

The focusing of the object glass is effected according to a known device by making a spherical projection rotate in the object-glass-carrier while sliding in a groove which constrains the object-glass to move in the direction of its axis.

The rotary motion of the spherical projection is obtained by making the knob 28 rotate; on the edge of this knob are arranged scales giving out the distances for which the object-glass is focused. Similar graduations are arranged on the drum 47 of the optical system (Fig. 5) rotating in front of the aperture 9 provided in the front panel 4 of the case.

A stationary pointer may be provided on this aperture. But as the drum 47 forms part of the mechanism and is therefore submitted to vibrations which are not transmitted to the box, the scale and pointer would move one with reference to the other which would lead to a difficult and inaccurate reading. It is therefore preferable to secure the pointer 48 to the stationary part of the object-glass-carrier. The focusing may be thus easily made by a helper standing to the side of the camera, actuating the knob 28 and reading the focusing distance either on the edge of this knob or through the aperture 9 on the drum 47 of the object-glass.

The rotation of the knob 28 cannot be transmitted to the adjusting means arranged to the front of the apparatus through a simple metallic shaft, as such a shaft would transmit vibrations. For this reason, I make the shaft 49 of ebonite or artificial resin and I insert elastic joints 51—51' in it. However, this arrangement produces a certain shifting between the position of the object-glass and that of the knob 28, by reason of the fact that at the beginning of the movement, the elastic joints are submitted to a certain deformation before they may produce a drive on the shaft.

Fig. 6 is a cross-section of the device used for giving out accurate indications and Fig. 7 shows the pointer thereof.

The knob 28 is mounted on a spindle 52 adapted to rotate with slight friction in an opening of the panel 3; this shaft drives the shaft 49 directly or through the agency of a gearwork 53. As stated hereinabove joints such as 51 are inserted in the shaft line 49, which joints comprise two metal plates 54, 54' provided with pins 55 held in a piece of soft rubber 56. In order to remove the effect of the shifting given out hereinabove, I make use of a pointer adapted to move through an angle a equal to that travelled by the knob before it drives the object-glass. This pointer (Figs. 6 and 7) is formed by a metal blade 57 the end 58 of which forming the pointer proper is folded over the edge of the knob, said blade being freely rotatable round the shaft 52. This blade is fitted between the knob 28 and a plate 58 rigidly secured to the shaft 52, through washers 59, 59' of fat-containing cloth. Thus the blade rotates with the knob 28 so long as nothing opposes such a rotation. This blade 57 is provided at its lower end with an aperture 61 through which passes a stationary pin 62; the size of the aperture 61 is chosen in a manner such that when the knob 28 has rotated with the pointer 57 through an angle a, the pin 62 comes into contact with the edge of the aperture 61 and stops the movement of the plate 57 which acts then as a stationary pointer.

This device allows the focusing to be modified during the view-taking while the players come nearer the camera or move away from it.

The control of the diaphragm may be effected in a similar manner.

It is sometimes useful to focus in a very accurate manner before the view-taking, the operator starting the view-taking only after the focusing has been effected accurately on the scene to be photographed. To this end it is necessary for the image to be projected no longer on the film but on a ground glass.

In order to obtain an easy substitution of the ground glass in place of the film, the rear plate 63 of the mechanism carries (Fig. 8) a plate 64 containing the channel through which the film passes to its impression gate 66. This plate is pivotally secured at 65 to the bottom of the mechanism plate 63 and is provided with an ordinary gate 66 through which the view taking is effected and also with an aperture 67 closed by a ground glass; when the plate 64 is caused to pivot through a suitable angle, the aperture 67 takes the place of the gate or reversely in the path of the light rays. The pivoting motion is obtained through an arm 68 rigidly secured to the plate 64 and provided at its end with a groove 69 which is engaged by the pin carried by the crank 71 mounted on the end of a shaft 72 passing (Fig. 5) through the whole apparatus and controlled by the handle 29. However it is absolutely necessary for this operation to be possible only when the motor is at rest or else the film driving pins would risk being deformed or broken; for this reason the connection between the shaft 72 and the handle 29 is provided in the manner shown in Figs. 9 and 10.

The shaft 72 ends with a plate 73 provided with two notches 74 and 74'; in front of this plate is a second plate 75 provided with projections 76 and 76' adapted to engage the notches 74 and 74' when the plate 75 is pushed leftwards. The plate 75 is mounted adjacent to another plate 77 of insulating material secured to one end of the spindle 78 the other end of which carries the handle 29.

The plates 75 and 77 are adapted to move in a stationary casing 79 carrying in its lower part a projection 81 a notch of which is normally engaged by a tooth 82 of the plate 75. Another tooth 83 of the same plate carries a metal blade 84 which provides the contact between two springs 85 and 86 electrically connected to the terminals of leads feeding the motor. In the position shown in the figure, the circuit of the motor is therefore closed. The working is easy to understand: in the position shown, the plate 75 and therefore the handle 26 are bolted through the engagement of the tooth 82 with the notch of 81. Thus it is impossible to move the device and there is no risk of switching off the motor current inadvertently through any unintentional operation of handle 29.

For turning handle 29, it is necessary to first push it leftwards which releases the tooth 82 with reference to the notch 81 and causes the projections 76 and 76' to engage the notches 74 and 74' so as to constrain the shaft 72 to move integrally with the handle 29; lastly the metal blade 84 is caused to move out of contact with reference to the springs, which switch off the current in the motor circuit. It is then sufficient to rotate the mechanism by hand through the driving wheel at 27 so as to disengage the plate 64 from the driving pins after which the handle is moved through one half-revolution so as to make the plate 64 pivot round its axis and make the ground glass appear in place of the gate.

Obviously in case of a three phase motor, it is necessary to provide several teeth such as 83 for switching off the different phases.

It may sometimes be required to return the film backwards, making the motor rotate in a direction reverse to the usual direction. In the preferred case of a three-phase motor, I may very simply provide this reversal by merely reversing the jack leading current to the plugs 31' of the current terminal 31 (Fig. 4).

This jack (Fig. 11) comprises two symmetrical parts 87 and 88 carrying on their outside sockets 89 and 91 adapted to engage the plugs. The three sockets 89 or the three sockets 91 serve for leading current to the motor; they are connected with the current feed wires forming part of cable 90 in a manner such that the rotation of the motor is reversed when the socket carrier 87—88 is reversed so as to engage the plugs through the sockets on its opposite side.

To the rear of the terminals 31 is a hand-operable switch urged constantly by a spring into a position corresponding to the opening of the circuit; a bolt may hold it against the action of the spring in the position corresponding to the closing of the circuit. This bolt may be hand-operated when it is desired to open the circuit or else it may be released by an electro-magnet 32 when the winding of the latter is energized. This magnet allows the stopping of the motor through the above mentioned anti-stuffing safety device.

Although it is less cumbersome and less heavy than the sound-proof apparatuses now in use, the apparatus described is still heavy so that it would be difficult to screw it in the usual manner on its stand. I have therefore provided means for securing it through fitting and bolting as shown in Figs. 12 to 15.

This mounting comprises a dove tailed joint, the male and female parts of the joint being larger on one side than on the other so as to allow an easier connection through mere sliding. The male part is constituted by a plate 92 secured to the lower panel of the case and provided with a dovetailed projection 93 which narrows from one end to the other. The female part pivotally mounted on its carrier comprises a plate 94 (Figs. 13 and 14) the upper surface of which is provided with a notch 95 the size and shape of which correspond to those of the projection 93. The mounting may thus be effected easily through mere sliding of the male part in the female part until it abuts against the end thereof. For holding the parts together, a bolt 96 carried by the plate 95 and passing through it may engage a notch 97 in the projection 93 when the two parts of the assembly are properly fitted one with reference to the other. There may however be some hindrance preventing the proper assembly of the parts due for instance to the accumulation of dirt at 100 at the bottom of the female grooves.

In order to prevent the camera from falling, the plate 94 carries a second bolt 98 similar to the abovementioned bolt and adapted to engage an elongated notch 99 arranged so that the bolt engages it before the device is at the end of its motion; this bolt 98 allows the camera to be pushed home but it would hold it if it were fortuitously to begin falling backwards.

The two bolts are arranged in a similar manner and extend underneath the plate 94 under the shape of rods terminated by incurved feet 102 and 103 and urged into their operative position by springs such as 104.

For removing the camera from its stand, the feet 102—103 are pressed together so as to make the bolts disappear into the recesses 105—106, provided in the plate 94. The camera is thus released and may be easily removed from its stand.

What I claim is:

1. A sound-proof camera comprising a camera mechanism including film reels, a motor and an object glass, a case of sound damping material constituted by a rigid assembly rigidly secured to the mechanism body and forming a rear, an upper and a lower wall, a front wall hingedly secured to the front of the upper wall and side walls hingedly secured to the sides of the rear wall, sound insulating means for securing permanently said mechanism to the rigid assembly of said case and control and supervision parts for the mechanism including a knob and magnifying glass for focusing the object glass and all carried by the rear wall of the case and adapted to rotatively control the mechanism in a sound proof manner.

2. A sound-proof camera comprising a camera mechanism including film reels, a motor and an object glass, a case of sound damping material constituted by a rigid assembly forming a rear, an upper and a lower wall, a front wall hingedly secured to the front of the upper wall and side walls hingedly secured to the sides of the rear wall, each wall consisting of a tongued and grooved plate of soft ebonite, an outer sheet of rubber over said plate, a metal protective cover for said sheet and a rubber packing adapted to be compressed inside the plate groove by the tongue of the adjacent wall plate, sound insulating means for securing permanently said mechanism to the rigid assembly of said case and control and supervision parts for the mechanism carried by the rear wall of the case and adapted to control the mechanism in a sound proof manner.

3. A sound-proof camera comprising a camera mechanism including film reels, a motor and an object glass, a case of sound damping material constituted by a rigid assembly forming a rear, an upper and a lower wall, a front wall hingedly secured to the front of the upper wall and side walls hingedly secured to the sides of the rear wall, an apertured shutter hingedly inserted in a sound-proof manner in the front wall and adapted to come in front of the object glass, a glass pane closing the aperture in said shutter, a diaphragm and bellows carried by said shutter in front of the glass pane, sound insulating means for securing permanently said mechanism to the rigid assembly of said case and control and supervision parts for the mechanism carried by the rear wall of the case and adapted to control the mechanism in a sound proof manner.

4. A sound-proof camera comprising a camera mechanism including film reels, a motor and an object glass, a case of sound damping material constituted by a rigid assembly forming a rear, an upper and a lower wall, a front wall hingedly secured to the front of the upper wall and side walls hingedly secured to the sides of the rear wall, an apertured shutter hingedly inserted in a sound-proof manner in the front wall and adapted to come in front of the object glass, a glass pane closing the aperture in said shutter, a diaphragm and bellows carried by said shutter in front of the glass pane, sound insulating means for securing permanently said mechanism to the rigid assembly of said case and control and supervision parts for the mechanism carried by the rear wall of the case and adapted to rotatively control the mechanism in a sound proof manner and including knobs and shafts controlled thereby and controlling the position of the object glass and the opening of the diaphragm, said shafts including intermediary sound-proof joints.

5. In a sound-proof camera as claimed in claim 4 the combination of a pointer, an apertured support for the pointer frictionally driven by the object-glass controlling knob, a stationary spigot passing through the aperture in the support adapted to hold the latter against rotation when it comes into contact with the edge of the aperture.

6. In a sound-proof camera as claimed in claim 4 the combination of a pointer, an apertured support for the pointer frictionally driven by the object glass controlling knob and a stationary spigot passing through the aperture in the support adapted to hold the latter against rotation when it comes into contact with the edge of the aperture, a scale for the object glass, a stationary pointer therefor inside the case and transparent means in the case walls for inspection of the scale and stationary pointer from the outside of the case.

7. A sound-proof camera comprising a camera mechanism including film reels, a removable motor and an object glass, a case of sound damping material constituted by a rigid assembly rigidly secured to the mechanism body and forming a rear, an upper and a lower wall, a front wall hingedly secured to the front of the upper wall and side walls hingedly secured to the sides of the rear wall, sound insulating means for securing permanently said mechanism to the rigid assembly of said case, control and supervision parts for the mechanism including parts for controlling the position of the object glass, and all carried by the rear wall of the case and adapted to rotatably control the mechanism in a sound-proof manner, a removable door provided in the rear wall of the case behind the location of the motor and adapted to afford a passage for introduction of the latter and means carried by said door adapted to positively engage the motor for hand actuation thereof.

ANDRÉ LÉON VICTOR
CLÉMENT DEBRIE.